US008620930B2

(12) United States Patent
Gulhane et al.

(10) Patent No.: US 8,620,930 B2
(45) Date of Patent: Dec. 31, 2013

(54) METHOD AND SYSTEM FOR DETERMINING SIMILARITY SCORE

(75) Inventors: Pankaj Gulhane, Bangalore (IN); Srinivasan Hanumantha Rao Sengamedu, Bangalore (IN); Ashwin Tengli, Bangalore (IN); Rajeev Rastogi, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 179 days.

(21) Appl. No.: 12/721,577

(22) Filed: Mar. 11, 2010

(65) Prior Publication Data

US 2011/0225173 A1 Sep. 15, 2011

(51) Int. Cl.
 *G06F 7/00* (2006.01)
(52) U.S. Cl.
 USPC .......................................... 707/749; 707/748
(58) Field of Classification Search
 None
 See application file for complete search history.

(56) References Cited

U.S. PATENT DOCUMENTS

| 6,026,398 | A * | 2/2000 | Brown et al. | 707/745 |
| 7,251,648 | B2 * | 7/2007 | Chaudhuri et al. | 707/749 |
| 7,827,186 | B2 * | 11/2010 | Hicks | 707/749 |
| 2004/0143508 | A1 * | 7/2004 | Bohn et al. | 705/26 |

OTHER PUBLICATIONS

Luis Gravano, Panagiotis G. Ipeirotis, Nick Koudas, Divesh Srivastava, "Text joins in an RDBMS for web data integration", International World Wide Web Conference, Proceedings of the 12th international conference on World Wide Web,Budapest, Hungary, Session: Information retrieval,Year of Publication: 2003, pp. 90-101, ISBN:1-58113-680-3.

Christopher D. Manning, Prabhakar Raghavan, Hinrich Schütze, "Introduction to Information Retrieval", Cambridge University Press, 2008, ISBN: 0521865719, also available at http://nlp.stanford.edu/IR-book/information-retrieval-book.html.

Chia-Hui Chang, Mohammed Kayed, Moheb Ramzy Girgis, Khaled Shaalan, "A Survey of Web Information Extraction Systems", IEEE Transactions on Knowledge and Data Engineering, Oct. 2006, pp. 1411-1428, doi:10.1109/TKDE.2006.152; and also available at http://www.csie.ncu.edu.tw/~chia/pub/iesurvey2006.pdf.

* cited by examiner

*Primary Examiner* — Paul Kim
(74) *Attorney, Agent, or Firm* — Kanika Radhakrishnan; Evergreen Valley Law Group, P.C.

(57) ABSTRACT

A method includes generating, electronically, one or more matching patterns for one or more pairs of attribute values. Each pair includes two attribute values. The two attribute values include a first attribute value from a first record and a second attribute value from a second record. The first attribute value and the second attribute value satisfy a first criterion. Further, the method includes identifying, electronically, matching segment between the first attribute value and the second attribute value of a first pair. The method also includes repeating identifying for each pair. Moreover, the method includes computing a similarity score for the first pair using one of the first pair and the matching segment based on the one or more matching patterns and matching segments of the one or more pairs satisfying a second criterion. The method also includes repeating computing for each pair.

16 Claims, 5 Drawing Sheets

|  | NAME | ADDRESS |
|---|---|---|
| R1 | Beijing Bites | 120 Lexington Avenue<br>New York, NY 10016 |
| R2 | China Club | 121 Lexington Avenue<br>New York, NY 10001 |

METHOD AND SYSTEM FOR DETERMINING SIMILARITY SCORE

BACKGROUND

Over the years, content available on websites has increased. With increased content there is a need for efficient content extraction techniques. One way of extracting contents includes computing a similarity score for an attribute "A" between attribute values of a data record stored in a database and an input webpage, and then deciding to extract content from the webpage as being relevant or deciding not to extract the content from the webpage as being irrelevant based on the similarity score. However, existing methods of computing similarity score can be error prone.

One existing method of computing similarity score is explained in conjunction with FIG. 1. Consider a data record 105. The data record 105 includes two attributes, for example NAME and ADDRESS, of restaurants. The data record 105 includes a record, for example R1. An exemplary webpage 110 can be available over a network. The webpage 110 has name and address of restaurant. The name and address of restaurant in the webpage 110 and record R1 belong to same real-world entity, which is Beijing Bites restaurant. Jaccard similarity technique can be used to compute the similarity score for an attribute "A" between attribute values of the data record 105 and the webpage 110. Jaccard similarity can be computed for two sets S1 and S2 as $$JC(S1, S2) = \frac{|S1 \cap S2|}{|S1 \cup S2|}$$

The similarity score (6/13) between value (115) of ADDRESS attribute in the record R1 and value (120) of ADDRESS attribute in the webpage 110 belonging to the same real-word entity is low due to additional line "(between 28th and 29th St)" in the ADDRESS attribute in the webpage 110 and due to presence of acronym "Ave" in the webpage 110. Similarly, value (125) of the NAME attribute in the record R1 and value (130) of the NAME attribute in the webpage 110 belonging to the same real-word entity has low similarity score of ⅓ due to wrong spelling of Beijing as Bejing in the webpage 110. The low similarity score for the same real-world entity can lead to ignoring of the webpage 110 as being non-relevant and hence can cause errors in extraction of relevant content.

SUMMARY

An example of a method includes generating, electronically, one or more matching patterns for one or more pairs of attribute values. Each pair of the one or more pairs of attribute values includes two attribute values. The two attribute values include a first attribute value from a first record and a second attribute value from a second record. The first attribute value and the second attribute value satisfy a first criterion. Further, the method includes identifying, electronically, matching segment between the first attribute value and the second attribute value of a first pair. The method also includes repeating identifying for each pair of the one or more pairs of attribute values. Moreover, the method includes computing a similarity score for the first pair using one of the first pair and the matching segment based on the one or more matching patterns and matching segments for the one or more pairs satisfying a second criterion. The method also includes repeating computing for each pair of the one or more pairs of attribute values.

An example of an article of manufacture includes a machine-readable medium, and instructions carried by the machine-readable medium. The machine-readable medium is operable to cause a programmable processor to generate one or more matching patterns for one or more pairs of attribute values. Each pair of the one or more pairs of attribute values includes two attribute values. The two attribute values include a first attribute value from a first record and a second attribute value from a second record. The first attribute value and the second attribute value satisfy a first criterion. Further, the matching segment between the first attribute value and the second attribute value of a first pair is identified. Identifying is performed for each pair of the one or more pairs. A similarity score using one of the first pair and the matching segment based on the one or more matching patterns and matching segments for the one or more pairs satisfying a second criterion is computed for the first pair. Moreover, computing is repeated for each pair of the one or more pairs of attribute values.

An example of a system includes a communication interface in electronic communication with a network to receive a second record. The system also includes a memory for storing instructions. Further, the system includes a processor responsive to the instructions to generate one or more matching patterns for one or more pairs of attribute values. Each pair of the one or more pairs of attribute values includes two attribute values. The two attribute values include a first attribute value from a first record and a second attribute value from a second record. The first attribute value and the second attribute value satisfy a first criterion. For a first pair of the one or more pairs of attribute values, the processor is responsive to the instructions to identify matching segment between the first attribute value and the second attribute value of the first pair. Identifying is performed for each pair of the one or more pairs. Further, the processor is responsive to the instructions to compute similarity score for the first pair using one of the first pair and the matching segment based on the one or more matching patterns and matching segments for the one or more pairs satisfying a second criterion. In addition, the processor is responsive to the instructions to repeat computing for each pair of the one or more pairs of attribute values.

DETAILED DESCRIPTION OF THE EMBODIMENTS

Figure 1:
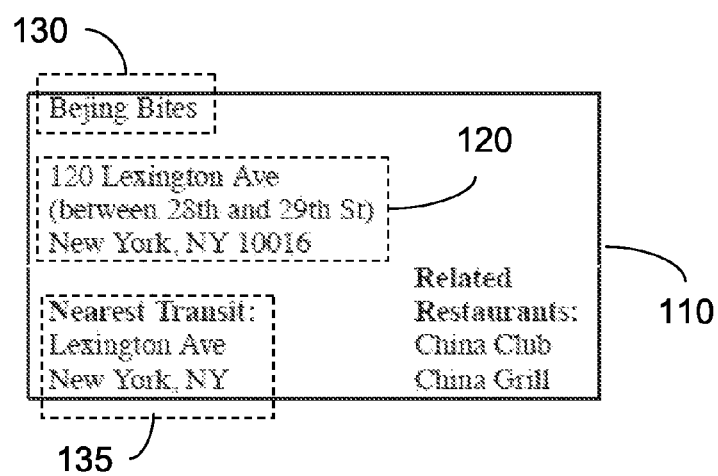
FIG. 1 illustrates a data record and a webpage.
Figure 2:
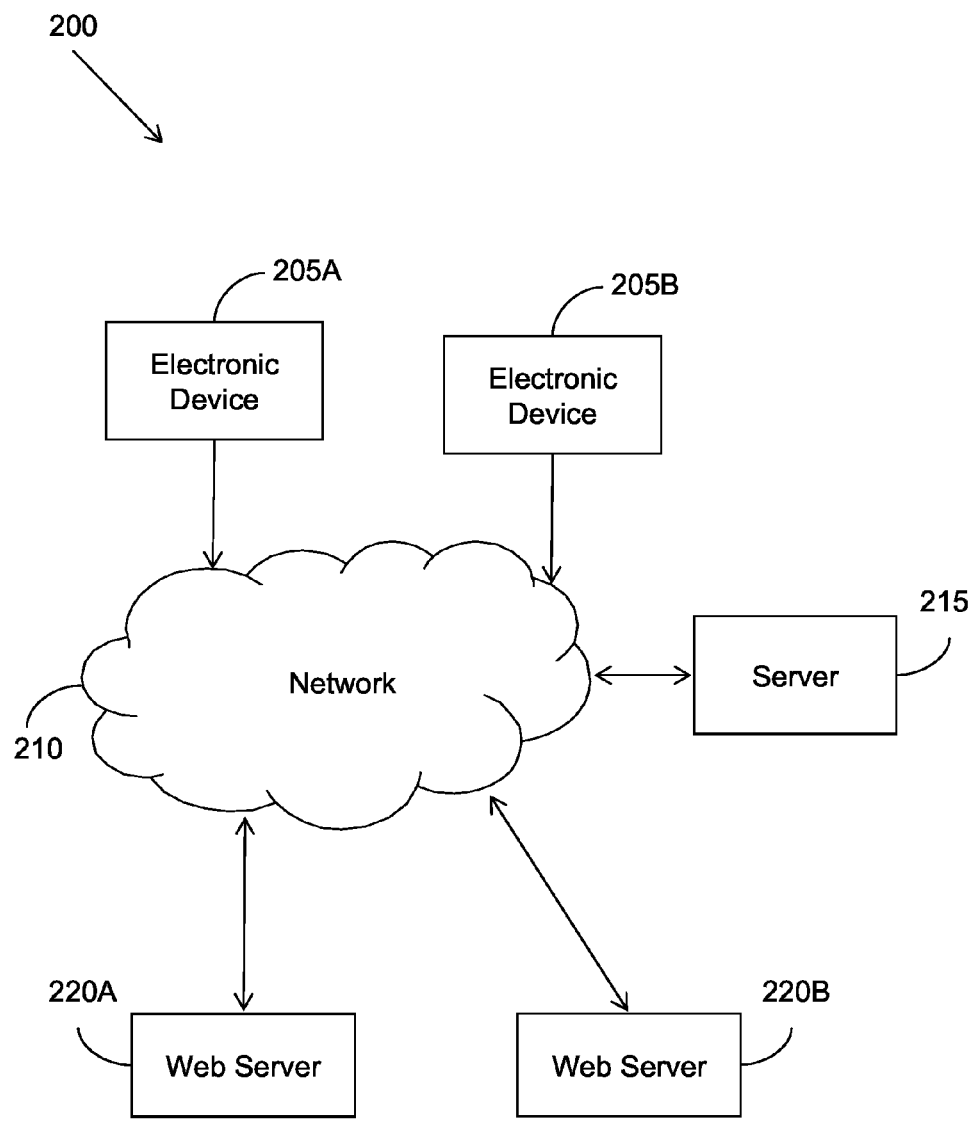
FIG. 2 is a block diagram of an environment, in accordance with one embodiment.

FIG. 2 is a block diagram of an environment 200, in accordance with one embodiment. The environment 200 includes one or more electronic devices, for example, an electronic device 205A and an electronic device 205B connected to a first server 215, hereinafter referred to as the server 215, through a network 210. The environment 200 also includes one or more web servers, for example a web server 220A and a web server 220B. The server 215 can also be a web server.

Examples of the electronic devices include, but are not limited to, computers, mobile devices, laptops, palmtops, internet protocol televisions (IPTVs) and personal digital assistants (PDAs). Examples of the network 210 include, but are not limited to, a Local Area Network (LAN), a Wireless Local Area Network (WLAN), a Wide Area Network (WAN), wired network, wireless network, internet and a Small Area Network (SAN).

The server 215 processes data and can include one or more hardware elements. The server 215 including hardware elements is explained in detail in conjunction with FIG. 5.

In one embodiment, processing data by the server 215 includes computing a similarity score for an attribute "A" between attribute values of records stored in a database and attribute values of an input set of webpages. The database can be present in the server 215 or in a storage unit that is in electronic communication with the server 215. The webpages can be from a single website or multiple websites. The similarity score can be used for performing various functions, for example extracting content from the webpages. The extraction of content further facilitates various applications for example providing search results or any further processing of extracted content. It is noted that extraction of contents include further processing based on the similarity score. An example corresponding to an application is now provided.

Example

A user of the electronic device 205A inserts a search query through search website for example Y! Search. The query can include key words. The query is received by the server 215 which then extracts content from information available over the network 210. Several stages can be involved in extraction of content.

In one example, extraction process performed by the server 215 includes populating a database with records based on few initial websites. A record includes an attribute name and an attribute value. The record corresponds to a real-life entity or a real world entity or an entity, hereinafter referred to as the entity. For example, Beijing Bites restaurant is an entity. Entity can include a physically known thing. Entity can also include things that have existence though not a material or physical existence. For example, entity can be defined by a set of attributes. For a schema for an event, the event can be an entity defined using attributes of the schema. The attributes of the schema can include "when", "where", "dress style", "ticket price" and so on. The attribute names corresponding to restaurant can include "NAME" and "ADDRESS". Values corresponding to each of the attribute names can be referred to as attribute values. For example, for Beijing Bites restaurant attribute value for NAME can be "Beijing Bites" and attribute value for ADDRESS can be "120 Lexington Avenue New York, N.Y. 10016". The records can be extracted from the initial websites by performing manual annotation of attribute values in the initial websites. Wrappers can then be learned or created based on the initial websites. The initial websites can also be referred to as training websites for creation of the wrappers. One record in the database includes attribute values for the entity from a single webpage. For example, there can be two records for the same entity having different attribute values for ADDRESS, each attribute value for the entity corresponding to one webpage.

Whenever webpages, also referred to as input webpages, are considered for extraction then attribute values for an attribute "A" in the input webpages are matched with that stored in the database. The matching includes computing a similarity score for the attribute "A" between various pairs, each pair formed by an attribute value for the attribute "A" in the database and an attribute value for the attribute "A" in each input webpage. The similarity scores between the attribute values ($U_i$, i=1 to n) for the attribute "A" in the records stored in the database and the attribute values ($V_j$, j=1 to m) for the attribute "A" in the input webpages are computed by the server 215. The similarity score is computed for each pair ($U_i$, $V_j$) by the server 215. The input webpages can be from a single website or multiple websites. Based on the similarity score satisfying predefined criterion a first record and a second record can be determined as matching and relevant to each other.

The first record refers to a record stored in the database and the second record refers to a webpage from input webpages. The second record can then be extracted and provided as a search result to the user based on further processing using the similarity score.

It is noted that the following description is explained using the first record being the record stored in the database and the second record being the webpage as an example. In some embodiments, the first record can refer to a webpage and the second record can refer to another webpage.

It is noted that wrapper learning and creation can be an ongoing process and the database can be augmented with entities not already present in the database. Wrapper learning can also include steps performed after computing the similarity score, for example extracting content based on the similarity score. Wrappers can be same or different for different websites.

It is noted that search application is an example of the application area where similarity score is used and the similarity score can be used for various purposes, for example data mining, data processing and so on.

Figure 3:
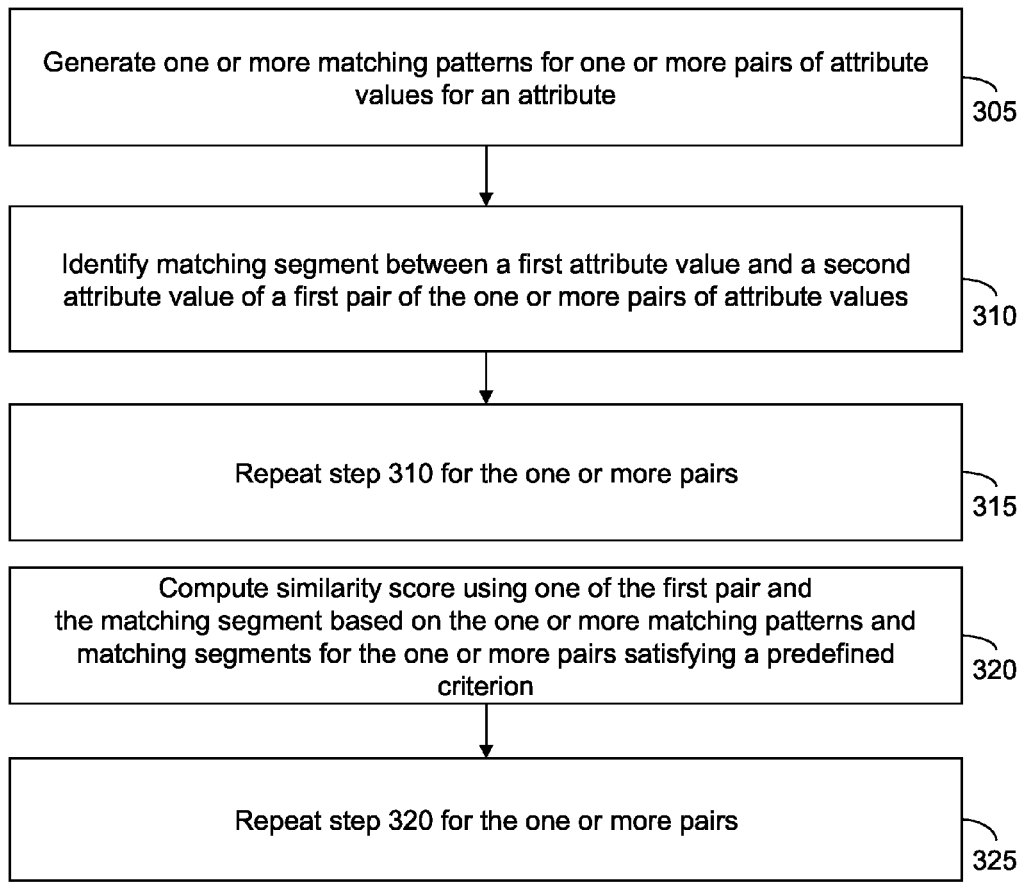
FIG. 3 is a flowchart illustrating a method for computing similarity score, in accordance with one embodiment.

FIG. 3 is a flowchart illustrating a method for computing similarity score, in accordance with one embodiment.

At step 305, one or more matching patterns for one or more pairs of attribute values for an attribute "A" are generated electronically, for example by using the server 215. Each pair of the one or more pairs of attribute values includes two attribute values. The two attribute values include a first attribute value from the first record and a second attribute value form the second record. The first record refers to a record stored in the database and the second record refers to a webpage from input webpages.

Each pair includes an attribute value from a set ($U_i$, i=1 to n) and an attribute value from a set ($V_j$, j=1 to m). The sets $U_i$ and $V_j$ correspond to attribute values for the same attribute "A", for example ADDRESS. In addition, $U_i$ corresponds to attribute values stored in the database and $V_j$ corresponds to attribute values in the input webpages.

In some embodiments, the set $U_i$ can also correspond to attribute values in webpages that are different than the input webpages.

In one aspect, step 305 can start at a point where the sets $U_i$ and $V_j$ are provided as input to the step 305. A check is performed to determine if each pair ($U_i$, $V_j$) satisfy a first criterion. The pairs satisfying the first criterion are considered for further computation.

The first criterion includes checking whether the attribute values in a pair have similarity (weak similarity) greater than a predefined similarity threshold ($T_w$). The pairs satisfying the first criterion can also be referred to as being weakly similar pairs, and the first attribute value and the second attribute value of such pairs can said to be satisfying the first criterion.

The first criterion can be checked by computing the similarity between the attribute values of the pair using various techniques, for example Jaccard similarity technique, cosine similarity metric, and cosine similarity over q-grams technique described in publication titled, "*Text joins in an RDBMS for web data integration*" authored by L. Gravano, P. Ipeirotis, N. Koudas, and D. Srivastava; International World Wide Web Conference, Proceedings of the 12th international conference on World Wide Web, Budapest, Hungary, SESSION: Information retrieval, Pages: 90-101, Year of Publication: 2003, ISBN:1-58113-680-3, which incorporated herein by reference in its entirety. Cosine similarity metric in conjunction with cosine similarity over q-grams technique can also be used. Cosine similarity metric is described in publication titled, "*Introduction to Information Retrieval*" authored by Christopher D. Manning, Prabhakar Raghavan and Hinrich Schütze; Cambridge University Press. 2008, ISBN: 0521865719, also available at http://nlp.stanford.edu/IR-book/information-retrieval-book.html, which is incorporated herein by reference in its entirety. The similarity can then be compared with predefined similarity threshold (Tw). The checking of first criterion described in detail in above-referenced publications is briefly described below in paragraphs 0031-0038.

Checking of First Criterion:

Each attribute value string can be considered as a sequence of words separated by special characters such as space, tab, hyphen, comma which are considered as word delimiters. Each word can be normalized by converting all letters to lower case.

Q-grams:

A q-gram set of a string can be defined as a set of q-length substrings of the string. The q-gram set of a word w can be denoted by qg(w). To ensure that characters at the start and end of the word w appear in a sufficient number of q-grams, w can be padded at the beginning and can be ended with q-1 occurrences of special padding character #. So for q=3, qg("china")={"##c", "#ch", "chi", "hin", "ina", "na#", "a##"}. Next, the q-gram set for an attribute value can be derived by taking the union of the q-grams in the words including the value. For a value v, the q-gram set qg(v)= $\cup_{w \in v}$ qg(w). The q-grams can handle spelling errors better than whole words. For example, Jaccard similarity between the strings "Beijing bites" and "bejing bites" is ⅓ because "Beijing" and "bejing" are treated as separate words. But with q-grams instead of words, the Jaccard similarity is more than ⅔.

Q-Gram Weights:

A weight is associated with each q-gram in qg(v) based on the importance of the word that it originates from. A popular inverse document frequency (IDF) weight is then used to capture the importance of each word w that appears in attribute A of a record stored in the database. For a word, attribute pair (w, A), IDFA(w) can be defined as log (N/$N_{A,w}$), where N=|R| is the number of records in the database R and $N_{A,w}$ is the number of records in the database R for which the attribute A includes w. The IDF score of a word decreases as its frequency increases, and hence common words have low IDF scores. The IDF value of a word can vary depending on the attribute. For example, the word "avenue" can have a low IDF score if it is part of the ADDRESS attribute, but can have a much higher score if it belongs to the NAME attribute.

A weight cv(e) can be assigned to each q-gram e in qg(v) equal to the sum of the IDF weights of all the words in v that contain e. For example, if $e_1, \ldots, e_k$ are the instances of q-gram e appearing in words $w_1, \ldots, w_k$ of v then $$cv(e) = \sum_{i=1}^{k} IDF(w_i).$$

The q-grams inherit important scores from the words that they originate from. By associating the IDF scores of words as the weights of q-grams in them, it can be ensured that qgrams belonging to important words are assigned higher weights. For example, the q-gram "ave" in the word "avenue" has a lower weight compared to its weight in "davenport" which is less common.

Weak Similarity:

Each value v can be conceptually matched into a vector in q-gram space, with the component in the dimension corresponding to q-gram e in qg(v) set to cv(e). The similarity between values u and v can then be computed using the Cosine similarity metric between their corresponding vectors in q-gram space. For a pair of values u and v for attribute A, the weak similarity simA(u, v) can be computed as $$simA(u, v) = \frac{\sum_{e \in [qg(u) \cap qg(v)]} c_u(e) \cdot c_v(e)}{\sqrt{\sum_{e \in qg(u)} c_u(e)^2} \cdot \sqrt{\sum_{e \in qg(v)} cv(e)^2}}$$

If simA(u,v) is greater than Tw then the pair is considered for further processing else the pair is considered dissimilar. In case an attribute value is missing in a webpage then NULL can be used to represent missing value and the weak similarity can then be zero.

In some embodiments, it might happen that the IDF value for a word w within the value v from the webpage is not defined since it is not part of the attribute in the record stored in the database. For such words, IDFA(w) can be set to the IDF weight of the closest word w' appearing in the attribute A of the records stored in the database. The Jaccard similarity between q-gram sets can be used to measure closeness between w and w'; thus, w' can be the word with the maximum JC(qg(w), qg(w')) score. In case there are multiple words w' with the maximum JC(qg(w), qg(w')) value, then IDFA(w) can be set to the average of their IDF weights.

The matching patterns are then generated for each pair satisfying the first criterion. The matching pattern is now explained with help of an example.

In illustrated example, the matching patterns are generated for attribute values of the attribute ADDRESS. Consider the first attribute value "120 Lexington Avenue, New York, N.Y. 10016" and the second attribute value "121 Lexington Avenue, between 28$^{th}$ and 29$^{th}$ street, New York, N.Y. 10016". The first attribute value can be segmented as follows:

1=120 Lexington Avenue
2=New York, N.Y. 10016

The second attribute value can be segmented as follows:

1=120 Lexington Avenue
2=between 28$^{th}$ and 29$^{th}$ street
3=New York, N.Y. 10016

A matching sequence for the first attribute value can be generated as 13 as segment 1 in the first attribute value matches segment 1 in the second attribute value and segment 2 in the first attribute value matches segment 3 in the second attribute value. Similarly, the matching sequence for the second attribute value can be generated as 102 as segment 1 in the second attribute value matches segment 1 in the first attribute value, segment 2 in the second attribute value does not match anything in the first attribute value, and segment 3 in the second attribute value matches segment 2 in the first attribute value. 1, 2, 3 ... N can be referred to as indexes of an attribute value. The matching pattern can be generated as concatenation of the matching codes as follows:
134|1023.

In generic aspect, generation of the matching pattern for a pair (U1,V1) includes segmenting U1 such that each segment in U1(V1) is either longest contiguous subsequence of words with a corresponding matching subsequence in V1(U1), or the longest contiguous subsequence of words with no matching words in V1(U1). The matching pattern P(U1) for U1 is a sequence of integers in which $I^{th}$ element is "0" if a segment in U1 does not match any segment in V1, else, it is index of the segment in V1 that matches the segment in U1. Similarly, matching pattern P(V1) for V1 can be determined. The P(U1) and the P(V1) can then be concatenated to generate the matching pattern P(U1,V1) for the pair (U1,V1). The pseudo code for generation of the matching patterns for the pairs of the attribute values is as follows:

```
Input: Values u = w_1, ... .w_k and v = w_1', ..., w_p', Matching M(u, v);
Output: Matching pattern P(u, v) between u and v;
Split u into segments s_1, ..., s_y, where each segment s is the longest
contiguous subsequence of words w_i, w_{i+1}, ... in u such that either
    There is a corresponding contiguous subsequence of words w_j',
    w'_{j+1}, ... in v such that the word pairs (w_i,w_j'), (w_{i+1},w'_{j+1}), ... are
    in M(u, v), or
    None of the words w_i,w_{i+1}, ... appear in M(u, v).
Segment v into segments s_1', ..., s_z' similar to u;
P(u) = E;
for i = 1 to y do
    if words in s_i do not appear in M(u, v) then
        Append a "0" to P(u);
    else
        Let s_j' be the segment in v that matches s_i in u (that is,
        consecutive word pairs from s_i and s_j' are contained in M(u, v));
        Append the index "j" for s_j' to P(u);
    end if
end for
Compute P(v) in a similar manner to P(u);
return P(u) · P(v);
```

In some embodiments, the generation of the matching patterns can be based on partial matching of segments in each pair. For example, segment 1 in the second attribute value can be "Lexington Ave". Since, the segment 1 in the second attribute value partially matches the segment 1 in the first attribute value the matching pattern can remain unchanged. The partial matching can be enabled based on need.

At step 310, a matching segment between the first attribute value and the second attribute value is identified electronically, for example by using the server 215, for a first pair of the pairs satisfying the first criterion. The matching segment includes two instances of words that are similar in the first attribute value and the second attribute value. The matching segment can be identified by ignoring the non-matching words.

For example, consider a pair (u,v), u corresponding to the set Ui and v corresponding to the set Vj, where u="120 Lexington Avenue, New York, N.Y. 10016" and v="120 Lexington Avenue, between $28^{th}$ and $29^{th}$ street, New York, N.Y. 10016" the matching words are "120 Lexington Avenue, New York, N.Y. 10016". Two instances of the matching words can together be referred to as the matching segment. One instance correspond to one attribute value from the pair, for example u'="120 Lexington Avenue, New York, N.Y. 10016" correspond to the attribute value u and v'="120 Lexington Avenue, New York, N.Y. 10016" correspond to the attribute value v.

At step 315, step 310 is repeated for all the pairs satisfying the first criterion to determine matching segments for the pairs satisfying the first criterion. One matching segment can be identified for each such pair.

In some embodiments, step 315 and step 310 can be a single step.

At step 320, a similarity score is computed electronically, for example by using the server 215, for the first pair. The similarity score, also referred to as a strong similarity score, can be computed using one of the first pair or the matching segment between the first attribute value and the second attribute value of the first pair based on the matching segments of the pairs and the one or more matching patterns satisfying a second criterion.

The second criterion can vary based on application and need. For example, for the pair (u,v) the second criterion includes determining if a pair (u, v) could potentially correspond to the same entity. The matching pattern for the pair (u,v) can be P(u,v). Whether the pair potentially correspond to the same entity can be determined in various ways.

In one example, the knowledge that within template based websites the webpages and hence, the attribute values also follow a templatized format can be used. A first check can be performed to determine whether a sufficiently large number of pairs (for other entities) also have the matching pattern P(u, v). In other words whether the repetition of the matching pattern P(u, v) exceeds a predefined threshold. If the number of pairs having the pattern P(u,v) is not crossing the predefined threshold then the pattern P(u, v) can be noise.

In another example, either a second check only or the second check in addition to the first check can also be performed. The second check includes checking whether the matching segment for the pairs with the matching pattern P(u, v) are sufficiently diverse. For example, if the matching segments u', v' for all ADDRESS value pairs with a specific pattern is simply a generic string like "new york ny", then it is possible that the ADDRESS values in each pair are for different entities, and so it can be desired not to boost similarity scores for such pairs and hence the similarity score can be computed using the pair (u,v) instead of u' and v'. In another aspect, if the matching segments u', v' are distinct strings including street number and street name, then each ADDRESS value pair with the matching pattern P(u,v) is very likely for the same entity, and so the similarity scores between attribute values in each pair can be computed by ignoring the non-matching words and using the matching segments for each pair. The second check can be performed by determining ratio of number of unique matching segments from the pairs and of number of unique pairs of attribute values. The ratio is determined for each matching pattern. If the ratio for the matching pattern P(u,v) exceeds a predefined threshold then the similarity score for the pair (u,v) can be computed using the matching segment u',v' else using the pair (u,v).

The second check is explained in conjunction with TABLE 1. TABLE 1 illustrates attribute values U1 and U2 corresponding to records stored in the database, and attribute values V1 to V20 corresponding to the input webpages for attribute ADDRESS.

TABLE 1

| Attribute Value Index | Attribute Value |
|---|---|
| U1 | 120 Lexington Avenue |
| U2 | 130 Bradford Street |
| V1 | 120 Lexington Avenue |

TABLE 1-continued

| Attribute Value Index | Attribute Value |
|---|---|
| V2 | 120 Lexington Avenue |
| V3 | 121 Lexington Avenue |
| V4 | 122 Lexington Avenue |
| V5 | 123 Lexington Avenue |
| V6 | 124 Lexington Avenue |
| V7 | 125 Lexington Avenue |
| V8 | 126 Lexington Avenue |
| V9 | 127 Lexington Avenue |
| V10 | 128 Lexington Avenue |
| V11 | 130 Bradford Street |
| V12 | 130 Bradford Street |
| V13 | 131 Bradford Street |
| V14 | 132 Bradford Street |
| V15 | 133 Bradford Street |
| V16 | 134 Bradford Street |
| V17 | 135 Bradford Street |
| V18 | 136 Bradford Street |
| V19 | 137 Bradford Street |
| V20 | 138 Bradford Street |

Since each pair in (U1, V(k=1 to 10)) are weakly similar matching patterns are generated for these 10 pairs. Similarly matching patterns are generated for other 10 pairs (U2, V(j=11 to 20)) as these 10 pairs are also weakly similar. Matching segments are also generated for all 20 pairs. The matching patterns are illustrated in TABLE 2.

TABLE 2

| PAIR | MATCHING PATTERN | MATCHING SEGMENT |
|---|---|---|
| (U1, V1) | 1\|1 | 120 Lexington Avenue \| 120 Lexington Avenue |
| (U1, V2) | 1\|1 | 120 Lexington Avenue \| 120 Lexington Avenue |
| (U1, V3) | 02\|02 | Lexington Avenue \| Lexington Avenue |
| (U1, V4) | 02\|02 | Lexington Avenue \| Lexington Avenue |
| (U1, V5) | 02\|02 | Lexington Avenue \| Lexington Avenue |
| (U1, V6) | 02\|02 | Lexington Avenue \| Lexington Avenue |
| (U1, V7) | 02\|02 | Lexington Avenue \| Lexington Avenue |
| (U1, V8) | 02\|02 | Lexington Avenue \| Lexington Avenue |
| (U1, V9) | 02\|02 | Lexington Avenue \| Lexington Avenue |
| (U1, V10) | 02\|02 | Lexington Avenue \| Lexington Avenue |
| (U2, V11) | 1\|1 | 130 Bradford Street \| 130 Bradford Street |
| (U2, V12) | 1\|1 | 130 Bradford Street \| 130 Bradford Street |
| (U2, V13) | 02\|02 | Bradford Street \| Bradford Street |
| (U2, V14) | 02\|02 | Bradford Street \| Bradford Street |
| (U2, V15) | 02\|02 | Bradford Street \| Bradford Street |
| (U2, V16) | 02\|02 | Bradford Street \| Bradford Street |
| (U2, V17) | 02\|02 | Bradford Street \| Bradford Street |
| (U2, V18) | 02\|02 | Bradford Street \| Bradford Street |
| (U2, V19) | 02\|02 | Bradford Street \| Bradford Street |
| (U2, V20) | 02\|02 | Bradford Street \| Bradford Street |

For each matching pattern 1|1 and 02|02 number of unique matching segments and number of unique pairs are then determined. For matching pattern 1|1 number of unique matching segments are equal to 2 (120 Lexington Avenue|120 Lexington Avenue and 130 Bradford Street|130 Bradford Street). Number of unique pairs for the matching pattern 1|1 are equal to 2 (120 Lexington Avenue, 120 Lexington Avenue and 130 Bradford Street, 130 Bradford Street). Similarly for the matching pattern 02|02 number of unique matching segments are equal to 2 (Lexington Avenue|Lexington Avenue and Bradford Street|Bradford Street) and number of unique pairs are 16 (8 pairs=120 Lexington Avenue, 121 Lexington Avenue to 120 Lexington Avenue, 128 Lexington Avenue; and 8 pairs=130 Bradford Street, 131 Bradford Street to 130 Bradford Street, 138 Bradford Street). Ratio for 1|1 matching pattern=1 (2/2) and for 02|02 matching pattern=2/18. For all pairs having matching pattern 1|1 the similarity score can be calculated using the matching segments as the ratio is greater than desired threshold. The similarity score can be calculated using the matching segment through at least one of jaccard similarity algorithm, Q-gram weight algorithm and any other weighting or tokenizing scheme. For all pairs having matching pattern 02|02 the similarity score can be calculated using corresponding pairs as the ratio is not greater than the desired threshold.

At step 325, step 320 is repeated for all the pairs satisfying the first criterion to determine corresponding similarity scores either by using corresponding matching segment or corresponding pair itself.

In some embodiments, step 325 and step 320 can be a single step.

The pseudo code for computing the similarity score, also referred to as strong similarity score ssimA(u,v) for a pair is as follows. The pseudo code covers step 310 to step 325.

```
Input: Sets of values U, V , Attribute a;
Output: Strong similarity scores ssimA for value pairs u' E U and v'E V;
Let WS = {(u, v) : u E U Λ v E V Λ simA(u, v) > Tw};
Initialize B( ) to Ø;
for each weakly similar pair (u, v) E WS do
    Construct a bipartite graph G with two sets of vertices corresponding
        to words in u and v;
    for each word pair w E u, w' E v do
        if JC(qg(w), qg(w')) > 0.9 then
            Add edge (w,w') with weight JC(qg(w), qg(w')) toG;
        end if
    end for
    Compute the max-weight bipartite matching M(u, v) of G;
    P(u, v)= MATCHINGPATTERN(u,v,M(u, v));
    Let u'(v') be the segment of u(v) containing only the matching words
        in M(u, v);
    Add the pair (u', v') to B(P(u, v));
end for
for each pair (u, v), u E U, v E V do
    if (u, v) is weakly similar and |B(P(u, v))| > α·|WS| then
        ssimA(u, v) = simA(u', v');
    else
        ssimA(u, v) = simA(u, v);
    end if
end for
return ssimA;
```

It is noted that numerical value "0.9" included in the pseudo code above is an exemplary value that can vary based on application need.

The method described in FIG. 3 can include various other steps before extraction of contents is complete and results are provided to the user. Further processing can include extracting contents based on the knowledge of the input webpages being belonging to the single website or multiple websites. Further processing can also include extracting contents based on similarity scores corresponding to different attributes. Various extraction algorithms can be used in further processing, for example extraction techniques described in publication titled, "*A Survey of Web Information Extraction Systems*" authored by Chia-Hui Chang, Mohammed Kayed, Moheb Ramzy Girgis, and Khaled Shaalan; *IEEE Transactions on Knowledge and Data Engineering*, vol. 18, no. 10, pp. 1411-1428, October 2006, doi:10.1109/TKDE.2006.152; and also available at http://www.csie.ncu.edu.tw/~chia/pub/iesurvey2006.pdf, which is incorporated herein by reference in its entirety.

Referring to TABLE 1 and TABLE 2, the method described in FIG. 3 prevents noisy results like 131 Bradford Street which are not corresponding to same entity as 130 Bradford Street. Since strong similarity scored is considered for pairs corresponding to the matching pattern 1|1 and weak similarity score for pairs corresponding to the matching pattern 02|02 the noisy results gets filtered out when considered similarity scores are compared against a threshold.

It is noted that in one example, the input webpages may have the attribute values in some templatized format. For example, the input webpages if corresponding to a single website can have the attribute values in a particular location or area of the webpage. The input webpages if corresponding to different websites can have the attribute values that are textually similar. In another example, if the input webpages do not have the attribute values in the templatized format then intelligence can be built in extraction techniques to extract content based on the knowledge that the input webpages do not have the attribute values in the templatized format.

Figure 4:
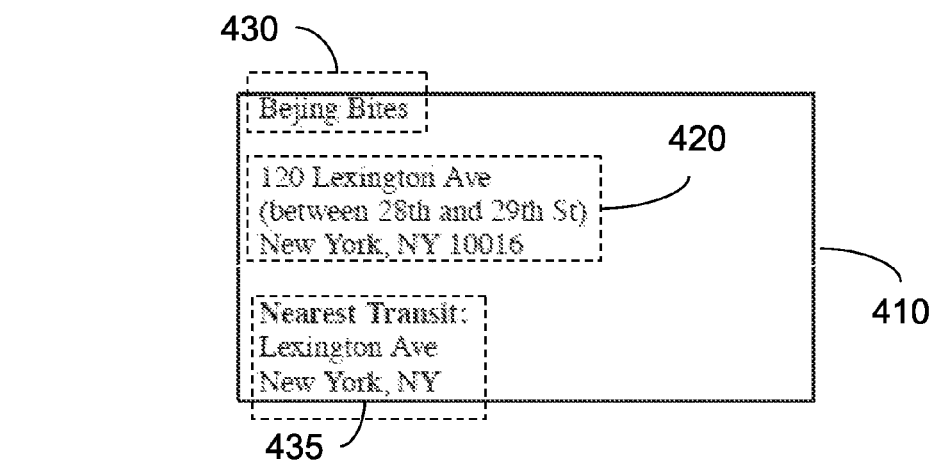
FIG. 4 illustrates a data record and a webpage.
Figure 4:
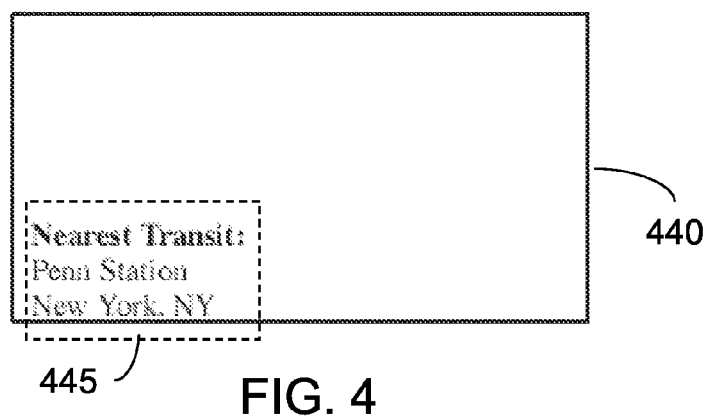

Referring to FIG. 4, a database 405. The database 405 includes two attributes, for example NAME and ADDRESS, of restaurants. The database 405 also includes two records, for example R1 and R2. An exemplary webpage 410 and an exemplary webpage 440 can be available over a network. The webpage 410 has a NAME value (430) and an ADDRESS value (420) of restaurant. The NAME value (430) and the ADDRESS value (420) of restaurant in the webpage 410, and a NAME value (425) and an ADDRESS value (415) of the record R1 belong to same real-world entity, which is Beijing Bites restaurant. The webpage 410 also has an ADDRESS value (435). Similarly a webpage 440 has an ADDRESS value (445).

Let U be a set of the ADDRESS value (415) in the record R1 and of an ADDRESS value (455) in the record R2, and V be a set of the ADDRESS value (435) in the webpage 410 and of the ADDRESS value (445) in the webpage 440. The ADDRESS value (415) is weakly similar to the ADDRESS value (435) in the webpage 410 and to the ADDRESS value (445) in the webpage 440. Similarly, the ADDRESS value (455) is weakly similar to the ADDRESS value (435) in the webpage 410 and to the ADDRESS value (445) in the webpage 440. Hence, all four pairs of ADDRESS values are considered. The matching patterns can be generated as illustrated in TABLE 3.

TABLE 3

| PAIR | MATCHING PATTERN | MATCHING SEGMENT |
|---|---|---|
| (ADDRESS value (415), ADDRESS value (435)) | 01030|204 | Lexington New York, NY| Lexington New York, NY |
| (ADDRESS value (415), ADDRESS value (445)) | 020|02 | New York, NY| New York, NY |
| (ADDRESS value (455), ADDRESS value (435)) | 01030|204 | Lexington New York, NY| Lexington New York, NY |
| (ADDRESS value (455), ADDRESS value (445)) | 020|02 | New York, NY| New York, NY |

The first check can then be performed. Each pattern 01030|204 and 02|02 has 2 repetitions. The total number of pairs is 4. In one example the threshold is 0.9*4=3.6. Since 2 does not exceed 3.6, the similarity score between each pair of the 4 pairs is computed using respective pair. The similarity score computed using respective pair can be computed using Jaccard similarity which results in weak similarity score. Hence, the weak similarity score are the considered similarity score resulting in filtering out of the webpage 410 and the webpage 440 when the considered similarity score are compared against the threshold.

On other hand if the pairs including the ADDRESS value (420) is considered then the similarity score between the ADDRESS value (420) and the ADDRESS value (415) is computed using the matching segment "120 Lexington New York, N.Y. 10016|120 Lexington New York, N.Y. 10016" resulting in high similarity score and hence extraction of the webpage 410 as being relevant after further processing.

Figure 5:
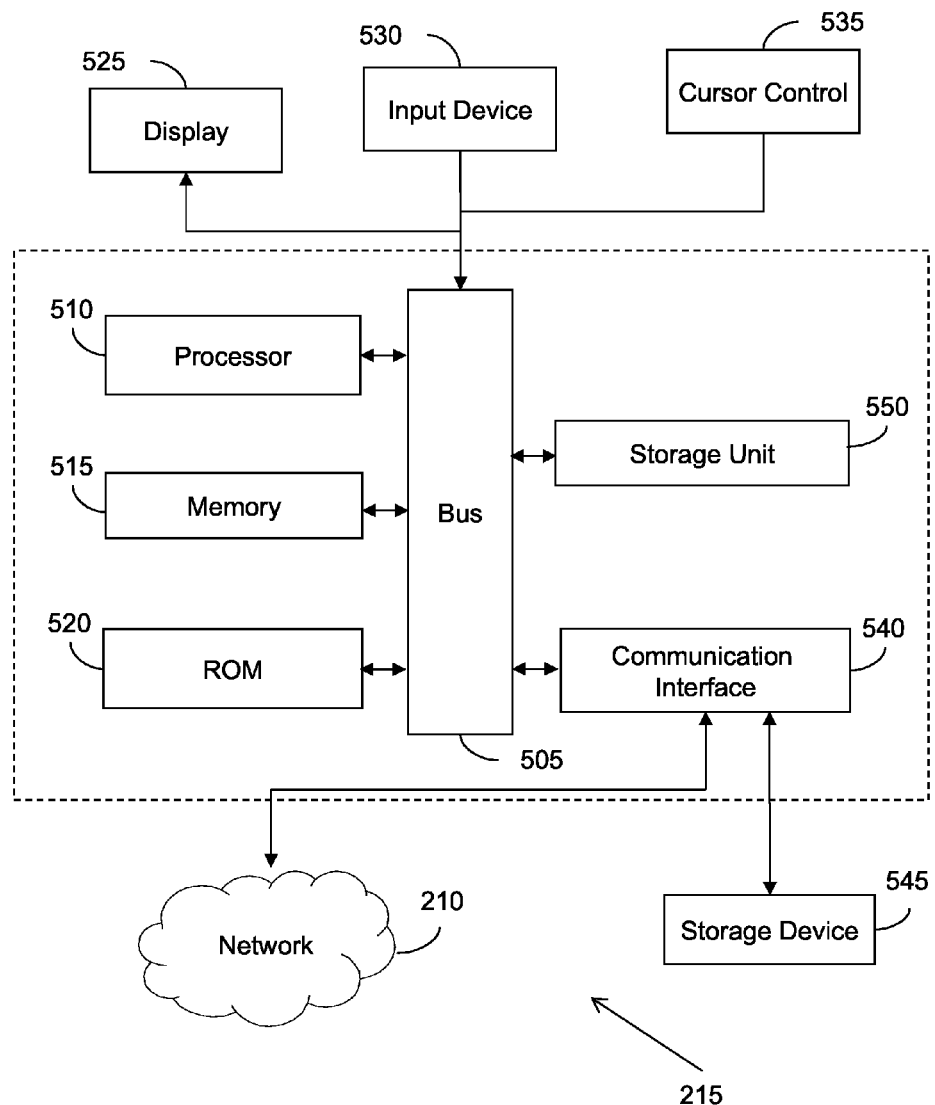
FIG. 5 illustrates a block diagram of a server, in accordance with one embodiment.

FIG. 5 illustrates a block diagram of the server 215, in accordance with one embodiment. The server 215 includes a bus 505 for communicating information, and a processor 510 coupled with the bus 505 for processing information. The server 215 also includes a memory 515, for example a random access memory (RAM) coupled to the bus 505 for storing instructions to be executed by the processor 510. The memory 515 can be used for storing temporary information required by the processor 510. The server 215 further includes a read only memory (ROM) 520 or other static storage unit coupled to the bus 505 for storing static information and instructions for processor 510. A storage unit 550, such as a magnetic disk or hard disk, can be provided and coupled to the bus 505 for storing information.

The server 215 can be coupled via the bus 505 to a display 525, for example a cathode ray tube (CRT) or liquid crystal display (LCD), for displaying information. An input device 530, including various keys, is coupled to the bus 505 for communicating information and command selections to the processor 510. In some embodiments, cursor control 535, for example a mouse, a trackball, a joystick, or cursor direction keys, for command selections to the processor 510 and for controlling cursor movement on the display 525 can also be present. The functioning of the input device 530 can also be performed using the display 525, for example a touch screen.

Various embodiments are related to the use of the server 215 for implementing the techniques described herein, for example in FIG. 3. The techniques can be performed by the server 215 in response to the processor 510 executing instructions included in the memory 515. The instructions can be read into the memory 515 from another machine-readable medium, such as the storage unit 550. Execution of the instructions included in the memory 515 causes the processor 510 to perform the techniques described herein.

The term machine-readable medium can be defined as a medium providing data to a machine to enable the machine to perform a specific function. The machine-readable medium can be a storage media. Storage media can include non-volatile media and volatile media. The memory 515 can be a volatile media. All such media must be tangible to enable the instructions carried by the media to be detected by a physical mechanism that reads the instructions into the machine.

Examples of the machine readable medium includes, but are not limited to, a floppy disk, a flexible disk, hard disk, magnetic tape, a CD-ROM, optical disk, punchcards, papertape, a RAM, a PROM, EPROM, and a FLASH-EPROM.

In some embodiments, the machine-readable medium can be transmission media including coaxial cables, copper wire and fiber optics, including the wires that include the bus 505. Transmission media can also take the form of acoustic or light waves, such as those generated during radio-wave and infra-red data communications. Examples of machine-readable medium may include but are not limited to carrier waves as describer hereinafter or any other media from which the server 215 can read, for example online software, download links, installation links, and online links. For example, the instructions can initially be carried on a magnetic disk of a remote computer. The remote computer can load the instructions into its dynamic memory and send the instructions over a telephone line using a modem. A modem local to the server 215 can receive the data on the telephone line and use an infra-red transmitter to convert the data to an infra-red signal. An infra-red detector can receive the data carried in the infra-red signal and appropriate circuitry can place the data on the bus 505. The bus 505 carries the data to the memory 515, from which the processor 510 retrieves and executes the instructions. The instructions received by the memory 515 can optionally be stored on the storage unit 550 either before or after execution by the processor 510. All such media must be tangible to enable the instructions carried by the media to be detected by a physical mechanism that reads the instructions into a machine.

The server 215 also includes a communication interface 540 coupled to the bus 505 for enabling data communication. Examples of the communication interface 540 include, but are not limited to, an integrated services digital network (ISDN) card, a modem, a local area network (LAN) card, an infrared port, a Bluetooth port, a zigbee port, and a wireless port.

The server 215 can be coupled to a storage device 545 that stores the database of the records. In some embodiments, the database can be stored in the server 215.

In some embodiments, the processor 510 can include one or more processing units for performing one or more functions of the processor 510. The processing units are hardware circuitry performing specified functions. The processing units can include, for example a matching pattern generator.

While exemplary embodiments of the present disclosure have been disclosed, the present disclosure may be practiced in other ways. Various modifications and enhancements may be made without departing from the scope of the present disclosure. The present disclosure is to be limited only by the claims.

What is claimed is:

1. A computer-implemented method comprising:
  generating, by a processor, one or more matching patterns for one or more pairs of attribute values for an attribute, each pair of the one or more pairs of attribute values comprising two attribute values, the two attribute values comprising a first attribute value from a first record and a second attribute value from a second record, the first attribute value and the second attribute value having a first similarity score satisfying a first criterion;
  segmenting, by a processor, the first attribute value, the second attribute value, or both the first attribute value and the second attribute value, wherein the segmenting segments instances of words that may be matched between the first and second attribute values;
  for a first pair of the one or more pairs of attribute values, identifying, by a processor, a matching segment between the first attribute value and the second attribute value of the first pair, wherein the identifying a matching segment is based on matching instances of words between the first and second attribute values;
  repeating identifying, by a processor, for each pair of the one or more pairs of attribute values;
  for the first pair of the one or more pairs of attribute values, computing, by a processor, a second similarity score using the first pair, and the matching segment,
  wherein said second similarity score is based on the one or more matching patterns and matching segments for the one or more pairs satisfying a second criterion, and wherein the second similarity score is stronger than the first similarity score;
  wherein computing the second similarity score for the first pair comprises:
    for each matching pattern, determining ratio of number of unique matching segments from the one or more pairs of attribute values and of number of unique pairs of attribute values from the one or more pairs of attribute values;
    computing the second similarity score using the matching segment if the ratio exceeds a predefined threshold for a matching pattern corresponding to the first pair; and
    computing the second similarity score using the first pair if the ratio does not exceed the predefined threshold for the matching pattern corresponding to the first pair; and
  repeating computing, by a processor, for each pair of the one or more pairs of attribute values.

2. The method as claimed in claim 1 and further comprising:
  extracting results based on the second similarity scores of the one or more pairs of attribute values.

3. The method as claimed in claim 1, wherein generating the one or more matching patterns comprises:
  generating the one or more matching patterns based on exact matching of segments in each pair of the one or more pairs of attribute values.

4. The method as claimed in claim 1, wherein computing the second similarity score for the first pair comprises:
  computing the second similarity score using the matching segment if repetition of a matching pattern, corresponding to the first pair, in the one or more matching patterns exceeds a predefined threshold.

5. The method as claimed in claim 1, wherein computing the second similarity score comprises using Q-gram weight algorithm.

6. The method as claimed in claim 1, wherein the first record corresponds to a record stored in a database and the second record corresponds to an input webpage.

7. The method as claimed in claim 1, wherein the first attribute value and the second attribute value having a first similarity score satisfying a first criterion comprises the first attribute value and the second attribute value having similarity greater than a predefined similarity threshold.

8. An article of manufacture comprising:
  a machine-readable medium; and
  instructions carried by the machine-readable medium and operable to cause a programmable processor to perform:
    generating one or more matching patterns for one or more pairs of attribute values for an attribute, each pair of the one or more pairs of attribute values comprising two attribute values, the two attribute values comprising a first attribute value from a first record and a second attribute value from a second record, the first attribute value and the second attribute value having a first similarity score satisfying a first criterion;
    segmenting, by a processor, the first attribute value, the second attribute value, or both the first attribute value and the second attribute value,
    wherein the segmenting segments instances of words that may be matched between the first and second attribute values;
    for a first pair of the one or more pairs of attribute values, identifying, electronically, a matching segment between the first attribute value and the second attribute value of the first pair, wherein the identifying a matching segment is based on matching instances of words between the first and second attribute values;
    repeating identifying for each pair of the one or more pairs of attribute values;
    for the first pair of the one or more pairs of attribute values computing a second similarity score using the first pair, and the matching segment, wherein said second similarity score is based on the one or more matching patterns and matching segments for the one or more pairs satisfying a second criterion, and wherein the second similarity score is stronger than the first similarity score;

wherein computing the second similarity score for the first pair comprises:

for each matching pattern, determining ratio of number of unique matching segments from the one or more pairs of attribute values and of number of unique pairs of attribute values from the one or more pairs of attribute values;

computing the second similarity score using the matching segment if the ratio exceeds a predefined threshold for a matching pattern corresponding to the first pair; and computing the second similarity score using the first pair if the ratio does not exceed the predefined threshold for the matching pattern corresponding to the first pair; and repeating computing for each pair of the one or more pairs of attribute values.

9. The article of manufacture as claimed in claim 8 and further comprising instructions operable to cause the programmable processor to perform:

extracting results based on the second similarity scores of the one or more pairs of attribute values.

10. The article of manufacture as claimed in claim 8, wherein generating the one or more matching patterns comprises:

generating the one or more matching patterns based on exact matching of segments in each pair of the one or more pairs of attribute values.

11. The article of manufacture as claimed in claim 8, wherein computing the second similarity score for the first pair comprises:

computing the second similarity score using the matching segment if repetition of a matching pattern, corresponding to the first pair, in the one or more matching patterns exceeds a predefined threshold.

12. The article of manufacture as claimed in claim 8, wherein the instructions carried by the machine readable medium and operable to cause a programmable processor to perform computing the second similarity score includes instructions operable to cause a programmable processor to perform:

jaccard similarity algorithm; and
Q-gram weight algorithm.

13. The article of manufacture as claimed in claim 8, wherein the first record corresponds to a record stored in a database and the second record corresponds to an input webpage.

14. The article of manufacture as claimed in claim 8, wherein the first attribute value and the second attribute value having a first similarity score satisfying a first criterion comprises the first attribute value and the second attribute value having similarity greater than a predefined similarity threshold.

15. A system comprising:

a communication interface in electronic communication with a network to receive a second record;

a memory for storing instructions; and a processor responsive to the instructions to:

segment the first attribute value, the second attribute value, or both the first attribute value and the second attribute value, wherein the segmenting segments instances of words that may be matched between the first and second attribute values;

generate one or more matching patterns for one or more pairs of attribute values for an attribute, each pair of the one or more pairs of attribute values comprising two attribute values, the two attribute values comprising a first attribute value from a first record and a second attribute value from the second record, the first attribute value and the second attribute value having a first similarity score satisfying a first criterion;

for a first pair of the one or more pairs of attribute values, identify matching segment between the first attribute value and the second attribute value of the first pair, wherein the identifying a matching segment is based on matching instances of words between the first and second attribute values;

repeat identifying for each pair of the one or more pairs of attribute values;

for the first pair, compute a second similarity score using the first pair, and the matching segment, wherein said second similarity score is based on the one or more matching patterns and matching segments for the one or more pairs satisfying a second criterion, and wherein the second similarity score is stronger than the first similarity score, wherein computing the second similarity score for the first pair comprises:

for each matching pattern, determining ratio of number of unique matching segments from the one or more pairs of attribute values and of number of unique pairs of attribute values from the one or more pairs of attribute values;

computing the second similarity score using the matching segment if the ratio exceeds a predefined threshold for a matching pattern corresponding to the first pair; and computing the second similarity score using the first pair if the ratio does not exceed the predefined threshold for the matching pattern corresponding to the first pair; and repeat computing for each pair of the one or more pairs of attribute values.

16. The system as claimed in claim 15, wherein the processor is further responsive to the instructions to:

extract results based on similarity scores of the one or more pairs of attribute values.

* * * * *